United States Patent
Lammi

(10) Patent No.: US 11,333,215 B2
(45) Date of Patent: May 17, 2022

(54) TWO-MODE TUNED VIBRATION ABSORBER

(71) Applicant: Textron Aviation Inc., Wichita, KS (US)

(72) Inventor: Zachary Alan Lammi, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 364 days.

(21) Appl. No.: 16/295,561

(22) Filed: Mar. 7, 2019

(65) Prior Publication Data
US 2019/0277364 A1 Sep. 12, 2019

Related U.S. Application Data

(60) Provisional application No. 62/639,692, filed on Mar. 7, 2018.

(51) Int. Cl.
*F16F 7/10* (2006.01)
*B64D 47/00* (2006.01)
(Continued)

(52) U.S. Cl.
CPC .............. *F16F 7/10* (2013.01); *B64C 11/008* (2013.01); *B64D 47/00* (2013.01); *F16F 7/104* (2013.01);
(Continued)

(58) Field of Classification Search
CPC .. F16F 7/104; F16F 7/108; F16F 7/116; F16F 2222/08; F16F 2228/04; F16F 2228/066; B64C 11/008
See application file for complete search history.

(56) References Cited

U.S. PATENT DOCUMENTS 4,736,701 A * 4/1988 Kondo .................... B63B 27/04
114/340
8,511,601 B2 * 8/2013 Dandaroy ............... F16F 7/104
244/1 N
(Continued)

OTHER PUBLICATIONS

Hodgkins, Jeffrey, et al; Applications of the Modally Enhanced Dynamic Absorber (MEDA), retrieved http://semimac.org/wp-content/uploads/2016/03/sem.org-IMAC-XXIII-Conf-s30p01-Applications-Modally-Enhanced-Dynamic-Absorber-MEDA-.pdf, 2016.

*Primary Examiner* — Nicholas J Lane
(74) *Attorney, Agent, or Firm* — Erise IP, P.A.

(57) ABSTRACT

A dual-frequency vibration-reduction apparatus includes a beam having a longitudinal axis and a transverse axis perpendicular to the longitudinal axis. An attachment mechanism mechanically couples a portion of the beam to a structure. One or more masses are attached to the beam such that the apparatus vibrates bi-modally at a primary frequency and a secondary frequency for reducing vibrations of the structure at the primary frequency and the secondary frequency. A first mode may be a bending mode of the apparatus, while a second mode is a torsion mode. The vibration reduction apparatus may be tuned such that the primary frequency substantially matches a blade-pass frequency of a propeller-driven aircraft and the secondary frequency substantially matches a harmonic of the blade-pass frequency. The vibration reduction apparatus includes a mounting mechanism for mounting to any structure requiring low-frequency vibration attenuation.

18 Claims, 3 Drawing Sheets

(51) Int. Cl.
 *B64C 11/00* (2006.01)
 *F16F 7/104* (2006.01)
(52) U.S. Cl.
 CPC ....... *F16F 2222/08* (2013.01); *F16F 2228/04* (2013.01); *F16F 2228/066* (2013.01)

(56) References Cited

U.S. PATENT DOCUMENTS

| | | | | |
|---|---|---|---|---|
| 9,948,081 | B1* | 4/2018 | Barry | H02G 7/14 |
| 2004/0108443 | A1* | 6/2004 | Ivers | F16F 7/104 |
| | | | | 248/638 |
| 2010/0061219 | A1* | 3/2010 | Soh | G11B 33/08 |
| | | | | 369/263.1 |
| 2014/0027601 | A1* | 1/2014 | Bartel | H01L 41/1132 |
| | | | | 248/550 |
| 2019/0003547 | A1* | 1/2019 | Hill | F16F 7/1005 |
| 2021/0025469 | A1* | 1/2021 | Mendoza | F16F 7/108 |

* cited by examiner

TWO-MODE TUNED VIBRATION ABSORBER

CROSS-REFERENCE TO RELATED APPLICATIONS

This application claims the benefit of U.S. Provisional Patent Application Ser. No. 62/639,692, entitled Two-Mode Tuned Vibration Absorber and filed Mar. 7, 2018, the disclosure of which is herein incorporated by reference in its entirety.

BACKGROUND

1. Field of the Disclosure

Embodiments of this disclosure relate generally to structural vibration mitigation, and more specifically to a tuned vibration absorber (TVA) for propeller-driven aircraft.

2. Description of the Related Art

Many tuned vibration absorbers (TVAs) have been described in the prior art; however, these are generally designed to attenuate vibrations at one particular frequency. U.S. Pat. No. 8,511,601 to Dandaroy et al. discloses an elastomer-type tuned vibration absorber for attenuating a single frequency mode.

SUMMARY

In an embodiment, a dual-frequency vibration-reduction apparatus includes a beam having a longitudinal axis and a transverse axis perpendicular to the longitudinal axis, an attachment mechanism for mechanically coupling a portion of the beam to a structure, and one or more masses attached to the beam such that the dual-frequency vibration-reduction apparatus vibrates bi-modally at a first frequency and a second frequency for reducing vibrations of the structure at the first frequency and the second frequency.

In another embodiment, a paired dual-frequency vibration reducer includes two dual-frequency vibration-reduction apparatuses. A first dual-frequency vibration-reduction apparatus is mounted opposite a structure from a second dual-frequency vibration-reduction apparatus. Torsion loads from the first vibration-reduction apparatus are substantially cancelled by the second vibration-reduction apparatus to avoid imposing torsion loads onto the structure.

In yet another embodiment, a tuned vibration absorber for attenuating a primary frequency vibration of a structure and a secondary frequency vibration of the structure is provided. The tuned vibration absorber includes a beam having an attachment bracket for attaching the beam to the structure, a first mass adjacent a first end portion of the beam, and a second mass adjacent a second end portion of the beam. The second end portion is opposite the first end portion along a longitudinal axis of the beam. The first mass and the second mass are adapted to provide a bending mode of the beam for attenuating the primary frequency vibration of the structure. The first mass has an uneven mass distribution along a transverse axis of the beam, which is perpendicular to the longitudinal axis. The second mass also has an uneven mass distribution along the transverse axis. The uneven mass distributions of the first mass and the second mass are adapted to excite a torsional mode of the beam, based on the bending mode. The torsional mode is adapted for attenuating the secondary frequency vibration of the structure.

In another embodiment, a tuned vibration absorber for attenuating vibrations of a structure at a primary frequency and a secondary frequency is provided. The tuned vibration absorber includes a first beam having an attachment bracket for attaching the first beam to the structure. A second beam is adjacent a first end portion of the first beam and has a first mass and a second mass near opposite ends of the second beam. A third beam is adjacent a second end portion of the first beam. The second end portion is opposite the first end portion along a longitudinal axis of the first beam. The third beam has a third mass and a fourth mass near opposite ends of the third beam. The second beam and the third beam are positioned about the first beam to provide a bending mode vibration of the first beam for attenuating a vibration of the structure at the primary frequency. The first mass and the second mass are positioned about the second beam, and the third mass and the fourth mass are positioned about the third beam, to provide a bending mode vibration of the second beam and the third beam, respectively, for providing a torsion mode vibration of the first beam for attenuating a vibration of the structure at the secondary frequency.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Propeller-driven aircraft produce loud noise and vibration at frequencies corresponding to a frequency of the blades of a rotating propeller, known as a blade pass frequency (BPF), and at harmonic frequencies of the BPF. On aircraft having more than one propeller, the propellers typically have the same number of blades and rotate at the same rate such that the propellers have the same BPF. Also, aircraft usually operate at a consistent cruise speed with the same propeller rate. Therefore, the BPF for a given aircraft is usually a consistent and known frequency that may be targeted for vibration reduction of structures of the aircraft.

Embodiments of the present disclosure provide a tuned vibration absorber (TVA) that decreases vibrations at two frequencies (e.g., at the BPF and at one harmonic frequency of the BPF). The TVA is mounted to a structure, and vibration of the TVA is tuned to counteract vibrations of the structure. By vibrating at two modes, the TVA "absorbs" (i.e., reduces) vibrations of the structure corresponding to frequencies of the two modes.

Generally, a bending mode type of TVA includes a mass (e.g., a weight) on the end of a beam. The beam dimensions and material, as well as the amount and position of a mass attached to the end of the beam, together determine a natural frequency at which bending of the beam resonates.

In some embodiments, the TVA may be adapted to reduce vibration at the BPF and at a harmonic frequency of the BPF that dominates the acoustic spectra (together with the BPF) for a particular propeller aircraft. In certain embodiments, the TVA may be adapted to reduce vibration for different combinations of the BPF with various harmonic tones (e.g., by adjusting the amount and position of masses coupled to a beam of the TVA, as described below). In some embodiments, the TVA is adapted for reducing vibration at other low frequency tones (e.g., at frequencies not necessarily associated with a BPF). In other embodiments, the TVA is adapted for reducing vibration at BPF frequencies during different regimes of flight. For example, the TVA may be adapted to provide noise and vibration reduction during the climb and cruise phases of flight, or during both long range and high-speed cruise (e.g., situations where different propeller rotational speeds are used).

Figure 1:
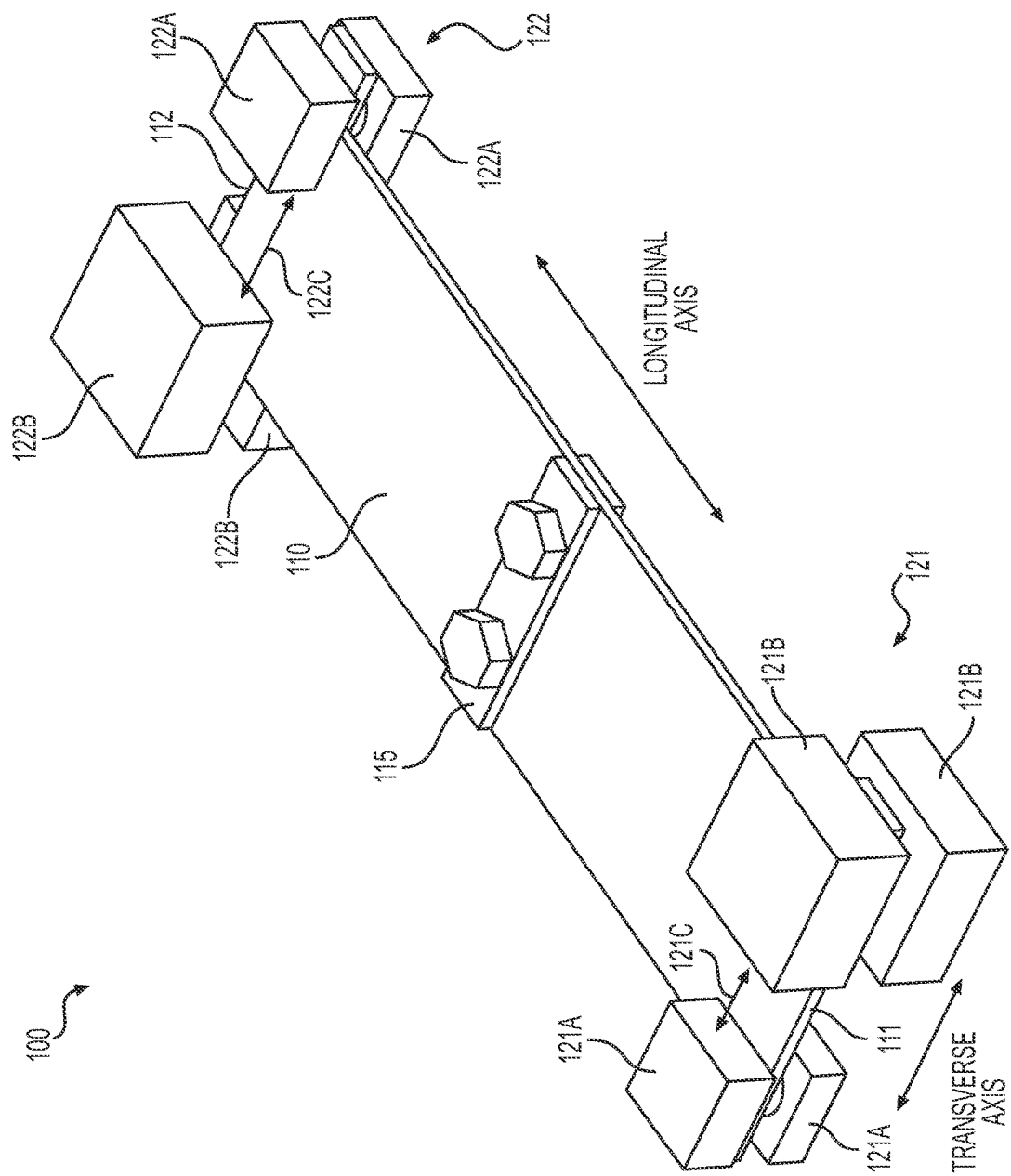
FIG. 1 is a perspective view of an embodiment of a tuned vibration absorber (TVA) that provides bi-modal vibrations adapted for attenuating vibrations of a structure at a primary frequency and a secondary frequency.

FIG. 1 is a perspective view of an exemplary TVA 100 having a secondary torsional mode vibration reducer. TVA 100 provides bi-modal vibrations including a bending mode vibration at a primary frequency and a torsional mode vibration at a secondary frequency for reducing vibrations of a structure at the primary and secondary frequencies, respectively. The torsion mode is characterized by twisting of a beam 110 around a longitudinal axis of the beam. In the example of a propeller-driven aircraft, the primary frequency is substantially matched with the BPF and the secondary frequency is substantially matched with a harmonic of the BPF.

TVA 100 includes beam 110, an attachment bracket 115, a first mass 121 located at or near a first end 111 of beam 110, and a second mass 122 located at or near a second end 112 of beam 110. The first and second ends 111, 112 are located at opposite ends of beam 110 along a longitudinal axis, as depicted in FIG. 1. Attachment bracket 115 is an example of an attachment mechanism adapted to enable a portion of TVA 100 to be mounted to a structure (not shown) for reducing vibrations of the structure. In a propeller-driven aircraft, the structure may include but is not limited to frames, stringers, skin portions, engine beam mounts, rudder pedals, and heads-up display (HUD) assemblies (see e.g., FIG. 3). Alternative attachment mechanisms (e.g., rivets, bolts, welding, and clamps) may be used without departing from the scope hereof. Attachment bracket 115 enables a mechanical coupling of beam 110 to the structure while allowing portions of the beam to flex or bend. In certain embodiments, attachment bracket 115 is located substantially near the middle of beam 110.

First mass 121 and second mass 122 are adapted to provide a bending mode vibration of beam 110 at a target frequency. In certain embodiments, the target frequency substantially matches the BPF. For example, the BPF may be in the range from about 20 Hz to about 40 Hz for a helicopter and less than 200 Hz for a propeller driven aircraft. In certain embodiments, the BPF is from about 28-32 Hz for a helicopter and about 150 Hz or less for a propeller driven aircraft. The length, material, and cross-sectional dimensions of beam 110, as well as the amount and location of first and second masses 121, 122 with respect to attachment bracket 115, contribute to the bending mode vibration frequency of beam 110. The amount of mass in first and second masses 121, 122 may each be independently adjusted (e.g., by swapping out objects that have different masses). Also, the positions of first and second masses 121, 122 may each be independently adjusted along the longitudinal axis of beam 110 for adjusting the bending mode vibration frequency of beam 110. Thus, TVA 100 may be adapted for achieving a variety of target frequencies.

First mass 121 and second mass 122 each include an uneven distribution of mass along a transverse axis of beam 110, the transverse axis being perpendicular to the longitudinal axis, as depicted in FIG. 1. The uneven distribution of mass may be provided in a variety of ways, including but not limited to objects of uneven shape or uneven density, or by forming a mass from a subset of smaller masses that are unevenly distributed (e.g., in number, size, density, and/or location). In the embodiment depicted in FIG. 1, first mass 121 includes a small portion 121A and a large portion 121B. Similarly, second mass 122 includes a small portion 122A and a large portion 122B. The large and small portions 121A, 121B of first mass 121 may be oriented oppositely along the transverse axis compared to the large and small portions 122A, 122B of second mass 122, as depicted in FIG. 1; however, in some embodiments, the uneven distribution of mass may be matched at both ends of beam 110. In other words, both small portions 121A, 122A are on the same transverse side of beam 110 and both large portions 121B, 122B are both on the opposite side, transversely speaking, of beam 110.

As depicted in FIG. 1, a first gap 121C is provided separating small portion 121A from large portion 121B. Similarly, a second gap 122C separates small portion 122A from large portion 122B. First and second gaps 121C, 122C are optional. Increasing the width of the gaps increases the moment of inertia for a given amount of mass, which alters the frequency of vibration. Alternatively, the width of the gaps is increased while the masses are modified to maintain a desired frequency of vibration. This enhances the effectiveness of the torsion mode.

The unevenly distributed masses of first mass 121 and second mass 122 provide a torsion mode vibration of beam 100 at a secondary frequency, which may be excited by the bending mode vibration at the primary frequency. The cross-sectional dimensions of beam 110 are adapted to provide the torsional mode at the secondary frequency using the same unevenly distributed masses (e.g., first mass 121 and second mass 122) that provide the bending mode vibration at the primary frequency. The torsion mode is predominately determined by the cross-section of beam 110. Thus, beam 110 may be adapted to provide both a torsion mode and a bending mode at different frequencies.

First and second masses 121, 122 and beam 110 include slots for easily adjusting positions of the first and second masses 121, 122 along the longitudinal axis for tuning the bending mode to the primary frequency, and along the transverse axis for tuning the torsion mode to the secondary frequency. Thus, TVA 100 provides vibration absorber modes at two frequencies that are each with a broad frequency range. TVA 100 may be tuned to each of the two frequencies by adjusting the positions of the masses 121, 122 along the beam 110. Additionally, first and second masses 121, 122 may be replaced with heavier or lighter masses to tune TVA 100.

The bending mode frequency of TVA 100 may be adjusted by moving first and second masses 121, 122 closer to, or further away from, the middle of beam 110 along the longitudinal axis. For example, moving first and second masses 121, 122 closer to the middle of beam 110 (e.g., towards mounting bracket 115) provides a higher frequency bending-mode vibration. Conversely, moving first and second masses 121, 122 further away from the middle of beam 110 provides a lower frequency bending-mode vibration. Similarly, moving the small portions 121A, 122A and large portions 121, 122B closer together along the transverse axis provides a higher frequency torsional-mode vibration, whereas moving the small portions 121A, 122A and large portions 121, 122B further apart along the transverse axis provides a lower frequency torsional-mode vibration.

TVA 100 provides a dual-frequency vibration-reduction apparatus for attenuating low frequency vibrations (e.g., <1 kHz) on any structure needing vibration reduction at two frequencies, which is particularly prevalent in propeller aircraft and helicopters. In certain embodiments, the primary frequency range is from about 20 Hz to about 200 Hz and the overall frequency range (primary and secondary frequencies) is from about 20 Hz to about 500 Hz. In some embodiments, the primary frequency range is from about 28 Hz to about 150 Hz and the overall frequency range is from about 28 Hz to about 450 Hz. Advantages of TVA 100 include that it is simple to tune for reducing vibrations at the primary and secondary frequencies and may be adjusted for treating many different frequency vibration problems, such as the BPF and the first harmonic, the BPF and the second harmonic, the BPF and the third harmonic, etc. By modifying first and second masses 121, 122, and their positions, TVA 100 may be tuned to a wide range of frequencies. This enables the same TVA 100 to be used on a variety of structures and at a variety of locations for increasing the effectiveness of attenuating structural vibration.

Figure 2:
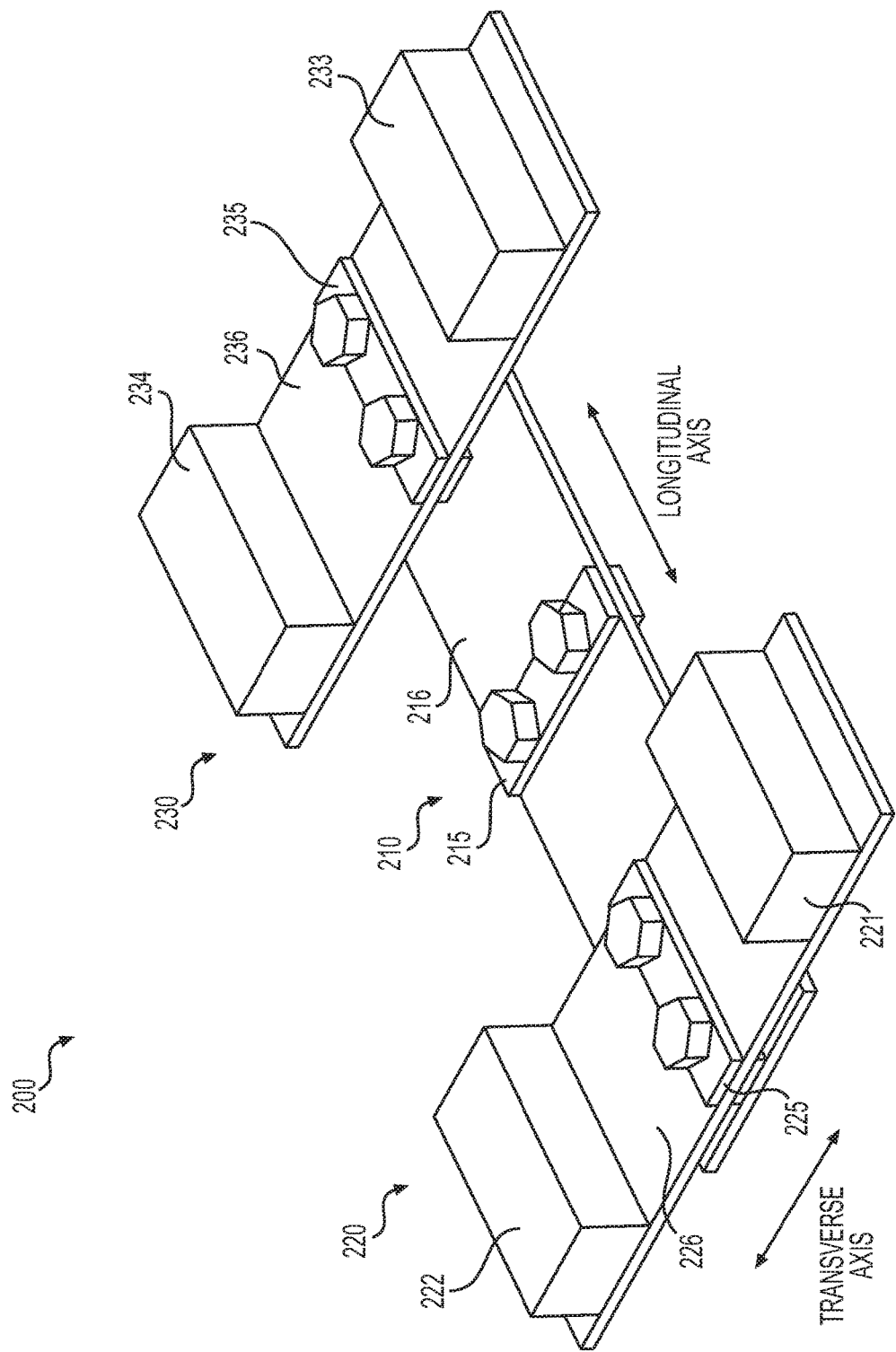
FIG. 2 is a perspective view of another embodiment of a TVA that provides bi-modal vibrations adapted for attenuating vibrations of a structure at a primary frequency and a secondary frequency.

FIG. 2 is a perspective view of an exemplary TVA 200 that provides bi-modal vibrations including a primary bending mode at a primary frequency and a secondary bending mode at a secondary frequency. TVA 200 includes a second TVA 220 and a third TVA 230 used as mass components of a first TVA 210. Each of the first, second, and third TVAs 210, 220, 230 include a beam, a mounting bracket positioned substantially near the middle of each beam, and a pair of masses positioned substantially near the ends of each beam. In the case of first TVA 210, the pair of masses positioned substantially near its ends are second TVA 220 and third TVA 230.

First TVA 210 includes a first mounting bracket 215 for attaching a first beam 216 to a structure (not shown) as described above for TVA 100. Second TVA 220 includes a first mass 221, a second mass 222, a second mounting bracket 225, and a second beam 226. First and second masses 221, 222 are preferably equal and adapted to produce a bending mode vibration of second beam 226 at the secondary frequency. Similarly, third TVA 230 includes a third mass 233, a fourth mass 234, a third mounting bracket 235, and a third beam 236. Third and fourth masses 233, 234 are preferably equal and adapted to produce a bending mode vibration of third beam 236 also at the secondary frequency. In embodiments, first, second, third, and fourth masses 221, 222, 233, 234 are equivalent in amount and position such that second TVA 220 and third TVA 230 each vibrate at the same frequency (e.g., the secondary frequency).

Second TVA 220 and third TVA 230 are adapted as masses for first beam 216 for providing a bending mode vibration along the longitudinal axis of first beam 216 to substantially match the primary frequency. Effectively, second TVA 220 and third TVA 230 act as a dead mass with respect to first TVA 210 at their respective ends of first TVA 210, which allows the bending mode of first TVA 210 to be tuned to the primary frequency (e.g., the BPF).

In the example of a propeller-driven aircraft, the primary frequency is substantially matched with the BPF and the secondary frequency is substantially matched with a dominant harmonic of the BPF.

The bending mode frequency of first TVA 210 may be adjusted by moving second TVA 220 and third TVA 230 closer to, or further away from, the middle of first beam 216 along its longitudinal axis. For example, moving second TVA 220 and third TVA 230 closer to the middle of first beam 216 (e.g., towards first mounting bracket 215) provides a higher frequency vibration. Conversely, moving second TVA 220 and third TVA 230 further away from the middle of first beam 216 provides a lower frequency vibration. First and second masses 221, 222 may be closer to, or further away from, the middle of second beam 226 for tuning second TVA 220. Similarly, third and fourth masses 233, 234 may be moved closer to, or further away from, the middle of third beam 236 for tuning third TVA 230.

TVA 200 provides a dual-frequency vibration-reduction apparatus for attenuating low frequency vibrations (e.g., <1 kHz) on any structure needing vibration reduction at two frequencies, which is particularly prevalent in propeller aircraft and helicopters. Advantages of TVA 200 include that it is simple to tune for reducing vibrations at the primary and secondary frequencies and may be adjusted for treating many different frequency vibration problems, such as the BPF and the first harmonic, the BPF and the second harmonic, the BPF and the third harmonic, etc. By modifying first, second, third, and fourth masses 221, 222, 233, 234, and their positions, and by modifying positions of second TVA 220 and third TVA 230, TVA 200 may be tuned to a wide range of frequencies (e.g., from about 20 Hz to about 500 Hz). This enables the same TVA 200 to be used on a variety of structures and at a variety of locations for increasing the effectiveness of attenuating structural vibration. In certain embodiments, the primary frequency range is from about 20 Hz to about 200 Hz and the overall frequency range (first and second frequencies) is from about 20 Hz to about 500 Hz. In some embodiments, the primary frequency range is from about 28 Hz to about 150 Hz and the overall frequency range is from about 28 Hz to about 450 Hz.

Figure 3:
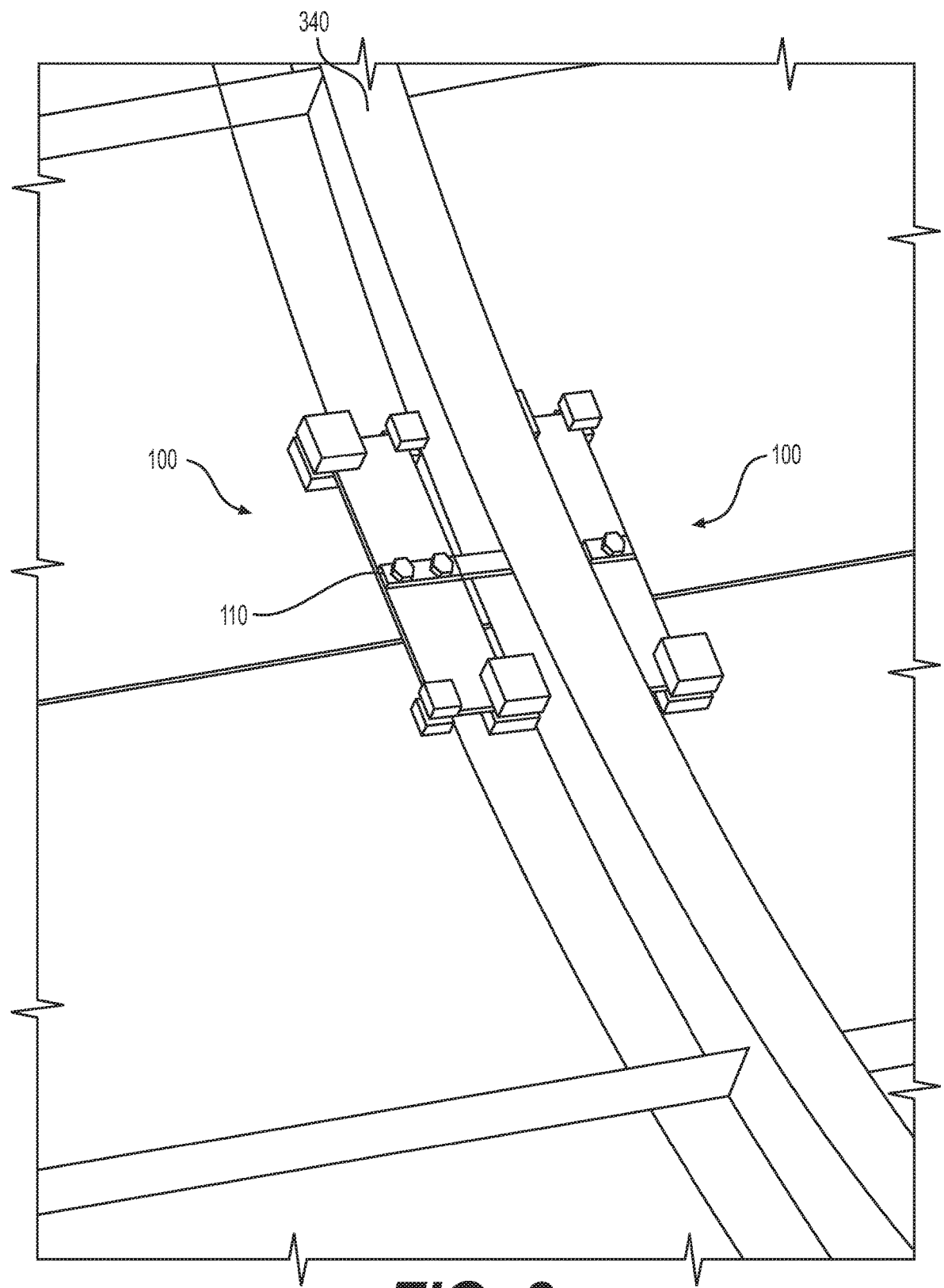
FIG. 3 shows the TVA of FIG. 1 mounted to an exemplary aircraft structure.

FIG. 3 shows TVA 100 mounted to a structure in an exemplary environment. The structure could be any of frames, stringers, skin portions, engine beam mounts, rudder pedals, and heads-up display (HUD) assemblies. As depicted in FIG. 3, two of TVA 100 are mounted as a pair on opposing sides of an aircraft frame 340 via bracket 115. Mounting TVA 100 in pairs assists with preventing torsion loads being imposed on the frame. Alternatively, a single TVA 100 may be mounted to frame 340 with a frame stiffener mounted to the opposite side of frame 340 (not shown).

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A dual-frequency vibration-reduction apparatus, comprising:
 a beam having a longitudinal axis and a transverse axis perpendicular to the longitudinal axis;
 an attachment mechanism for mechanically coupling a portion of the beam to a structure; and one or more masses attached to the beam such that the dual-frequency vibration-reduction apparatus vibrates bi-modally at a first frequency and a second frequency for reducing vibrations of the structure at the first frequency and the second frequency,
wherein the one or more masses each are adjustably coupled to the beam for adjusting a position along the longitudinal axis and the transverse axis, thereby enabling the dual-frequency vibration-reduction apparatus to be tuned for attenuating a variety of frequency vibrations.

2. The dual-frequency vibration-reduction apparatus of claim 1, wherein the one or more masses have an uneven mass distribution with respect to the transverse axis.

3. The dual-frequency vibration-reduction apparatus of claim 1, wherein the first frequency is substantially matched with a blade-pass frequency of a propeller-driven aircraft and the second frequency is substantially matched with a harmonic of the blade-pass frequency.

4. The dual-frequency vibration-reduction apparatus of claim 1, wherein the structure is one of a frame, a stringer, a skin portion, an engine beam mount, a rudder pedal, or a heads-up display assembly.

5. A paired dual-frequency vibration reducer, comprising two of the dual-frequency vibration-reduction apparatuses of claim 1, wherein a first dual-frequency vibration-reduction apparatus is mounted opposite the structure from a second dual-frequency vibration-reduction apparatus, such that torsion loads from the first vibration-reduction apparatus are substantially canceled by the second vibration-reduction apparatus to avoid imposing torsion loads onto the structure.

6. A tuned vibration absorber for attenuating a primary frequency vibration of a structure and a secondary frequency vibration of the structure, comprising:
a beam having an attachment bracket for attaching the beam to the structure;
a first mass adjacent a first end portion of the beam;
a second mass adjacent a second end portion of the beam, the second end portion being opposite the first end portion along a longitudinal axis of the beam, wherein the first mass and the second mass are adapted to provide a bending mode of the beam for attenuating the primary frequency vibration of the structure;
the first mass having an uneven mass distribution along a transverse axis of the beam, the transverse axis being perpendicular to the longitudinal axis; and
the second mass also having an uneven mass distribution along the transverse axis, wherein the uneven mass distributions of the first mass and the second mass are adapted to excite a torsional mode of the beam, based on the bending mode, the torsional mode being adapted for attenuating the secondary frequency vibration of the structure.

7. The tuned vibration absorber of claim 6, wherein the primary frequency is substantially matched with a blade-pass frequency of a propeller-driven aircraft and the secondary frequency is substantially matched with a harmonic of the blade-pass frequency.

8. The tuned vibration absorber of claim 6, wherein the structure is one of a frame, a stringer, a skin portion, an engine beam mount, a rudder pedal, or a heads-up display assembly.

9. The tuned vibration absorber of claim 6, wherein the first mass and the second mass are each adjustably coupled to the beam for adjusting their position along the longitudinal axis and the transverse axis, thereby enabling the tuned vibration absorber to be tuned for attenuating a variety of frequency vibrations.

10. The tuned vibration absorber of claim 9, wherein the first mass and the second mass are each adjusted closer to the middle of the beam to provide a higher frequency bending mode of the beam, and the first mass and the second mass are each adjusted further from the middle of the beam to provide a lower frequency bending mode of the beam.

11. The tuned vibration absorber of claim 6, wherein the uneven mass distribution of the first mass is unevenly distributed in an opposite orientation with respect to the transverse axis compared to the uneven mass distribution of the second mass.

12. The tuned vibration absorber of claim 6, the first mass comprising a subset of smaller masses that are unevenly distributed along the transverse axis thereby providing the uneven mass distribution of the first mass.

13. The tuned vibration absorber of claim 6, wherein the first mass comprises a small portion and a large portion separated by a gap along the transverse axis, the width of the gap being increased by adjusting positions of the small portion and the large portion thereby increasing the moment of inertia.

14. The tuned vibration absorber of claim 13, wherein the small portion and the large portion are moved closer together along the transverse axis to provide a higher frequency torsional mode of the beam, and the small portion and the large portion are moved further apart along the transverse axis to provide a lower frequency torsional mode of the beam.

15. A dual-frequency vibration-reduction apparatus, comprising:
a beam having a longitudinal axis and a transverse axis perpendicular to the longitudinal axis;
an attachment mechanism for mechanically coupling a portion of the beam to a structure; and
one or more masses attached to the beam such that the dual-frequency vibration-reduction apparatus vibrates bi-modally at a first frequency and a second frequency for reducing vibrations of the structure at the first frequency and the second frequency,
wherein the one or more masses are each adjustable for enabling the dual-frequency vibration-reduction apparatus to be tuned for attenuating a variety of frequency vibrations,
wherein an amount of mass from each mass of the one or more masses is unevenly distributed about the beam on one or more of the longitudinal axis and the transverse axis,
wherein an uneven distribution of the one or more masses is adapted to excite a torsional mode vibration of the beam.

16. The dual-frequency vibration-reduction apparatus of claim 15, wherein the one or more masses are adjustable by replacement with at least one or more masses of a varied weight.

17. The dual-frequency vibration-reduction apparatus of claim 15, wherein a position of the one or more masses is adjustable along the longitudinal axis and the transverse axis.

18. The dual-frequency vibration-reduction apparatus of claim 15, wherein the first frequency is substantially matched with a blade-pass frequency of a propeller-driven aircraft and the second frequency is substantially matched with a harmonic of the blade-pass frequency.

* * * * *